United States Patent [19]
Dowling et al.

[11] Patent Number: 5,995,086
[45] Date of Patent: Nov. 30, 1999

[54] METHOD OF GENERATING MULTIPLE-MASTER TYPEFACES

[75] Inventors: Terence S. Dowling, Saratoga; Jonathan A. von Zelowitz, San Francisco, both of Calif.

[73] Assignee: Adobe Systems, Inc., Mountain View, Calif.

[21] Appl. No.: 08/907,338

[22] Filed: Aug. 6, 1997

Related U.S. Application Data

[63] Continuation of application No. 08/684,921, Jul. 22, 1996, abandoned, which is a continuation of application No. 08/291,602, Aug. 16, 1994, abandoned.

[51] Int. Cl.$^6$ ............................................. G09G 5/24
[52] U.S. Cl. ............................. 345/194; 345/195
[58] Field of Search ............................. 345/194, 195, 345/141, 143

[56] References Cited

U.S. PATENT DOCUMENTS

| | | | |
|---|---|---|---|
| 4,933,866 | 6/1990 | Markoff et al. | |
| 5,042,075 | 8/1991 | Sato | 345/143 X |
| 5,185,818 | 2/1993 | Warnock | 382/54 |
| 5,301,267 | 4/1994 | Hassett et al. | 395/150 |
| 5,319,358 | 6/1994 | Martinez et al. | 345/141 |
| 5,398,306 | 3/1995 | Karow | 395/110 |

OTHER PUBLICATIONS

ITC Specimen Book, selected pages, 1976.
Karow, Peter, "*Font Technology Methods and Tools*," URW Software & Type GmbH, Springer–Verlag 1994, pp. V and 105–149.
Boag, A., "Fonts: A survey of current issues," Desktop Publishing Commentary, Jun. 1994, UK, vol. 10, No. 2, ISSN 0957–3178, pp. 6–9.
Haralambous, Y., "Parametrization of PostScript fonts through METAFONT—an alternative to Adobe Multiple Master Fonts," Third International Conference on Raster Imaging and Digital Typography. RIDT'94, Darmstadt, Germany, Apr. 11–13, 1994, vol. 6, No. 3, ISSN 0894–3982, Electronic Publishing: Origination, Dissemination and Design, Sep. 1993, UK, pp. 145–157.
McQueen, C.D., III, et al., "Infinifont: a parametric font generation system," Third International Conference on Raster Imaging and Digital Typography. RIDT'94, Darmstadt, Germany, Apr. 11–13, 1994, vol. 6, No. 3, ISSN 0894–3982, Electronic Publishing: Origination, Dissemination and Design, Sep. 1993, UK, ppl 117–32.
The New Print Shop, Bryderbund Software, Inc., 1990, pp. 24–25.

*Primary Examiner*—Amare Mengistu
*Attorney, Agent, or Firm*—Fish & Richardson P.C.

[57] ABSTRACT

A method of displaying predefined characters contained in a font which maintain their artistically pleasing shapes as font design properties change over a font design axis (which defines a variable font design property) including the steps of:

(1) including within each character definition a character-specific transition point which will be used to select a predefined character attribute of the character when it is displayed, the transition point lying along the font design axis;

(2) selecting a value for the variable font design property of the character along the font design axis, and then determining a predefined character attribute for the character based upon the location of the selected value in relation to the character-specific transition point along the font design axis; and (3) displaying the character using the selected value of the variable font design property and the determined, predefined character attribute.

12 Claims, 4 Drawing Sheets

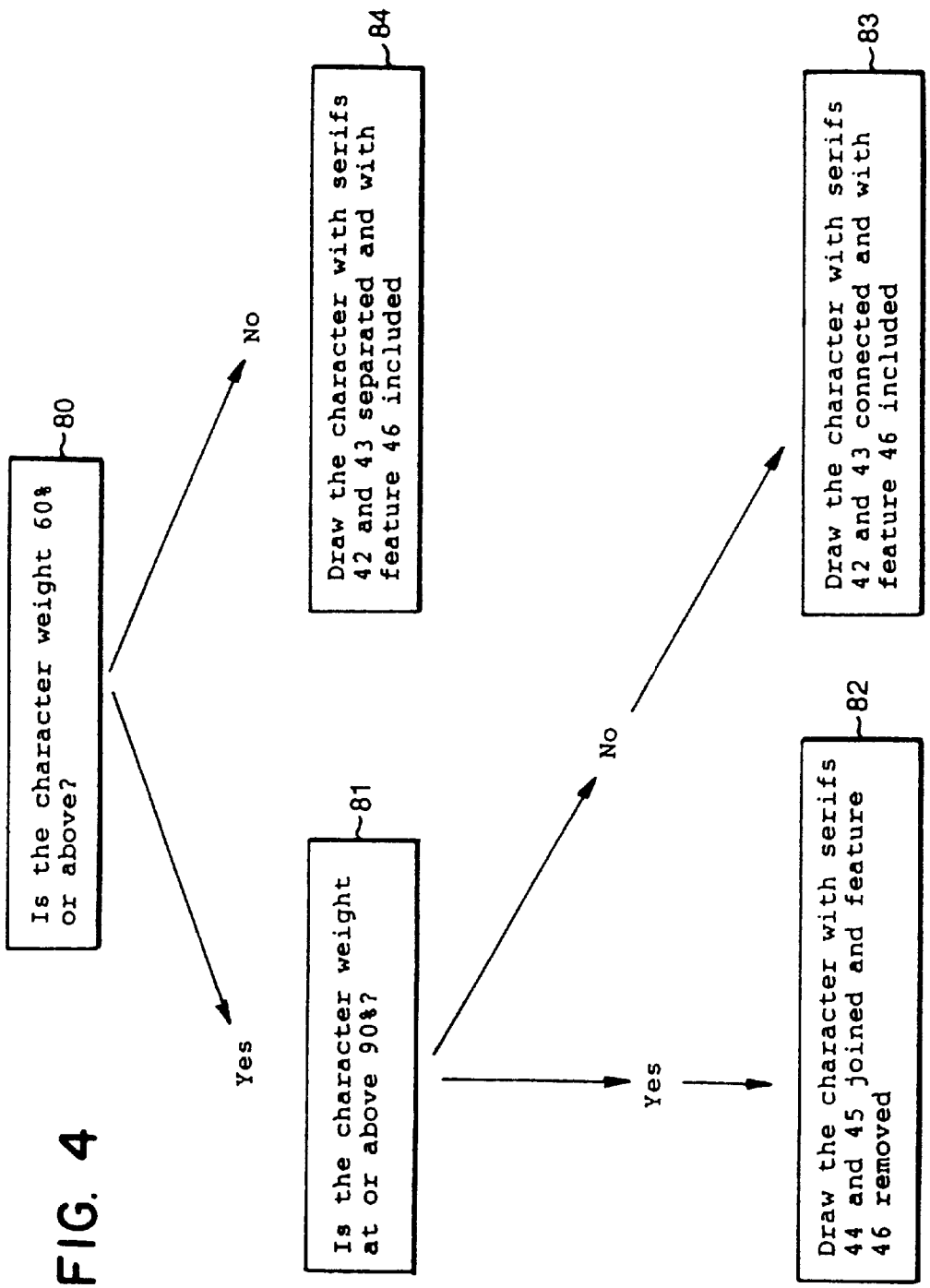

METHOD OF GENERATING MULTIPLE-MASTER TYPEFACES

This is a continuation of application Ser. No. 08/684,921, filed Jul. 22, 1996, now abandoned, which was a continuation of Ser. No. 08/291,602, filed on Aug. 16, 1994, now abandoned.

FIELD OF THE INVENTION

This invention relates to an improvement in the method of generating of multiple master typefaces. A multiple master typeface allows the user to create a myriad of fonts by selecting values for the font variables, or "design axes," which define font properties such as width, weight, size and style. The user can generate any instance of a character within this multiple master typeface by interpolating master shapes using a combination of the font variables. This invention allows the user to obtain predefined characters of a font, which are not pure interpolations, and which maintain their artistically pleasing shapes as font design properties change along a font design axis.

BACKGROUND OF THE INVENTION AND PRIOR ART

Multiple master typefaces have been used since the early 1980's when they were introduced in Germany in a computerized typeface generation system called "Ikarus". These typefaces were also described in U.S. Pat. No. 4,933,866 which issued on Jun. 12, 1990, and is incorporated herein by reference.

As a simple example of multiple master typefaces, consider a typeface with a design matrix based on a single variable—weight. This weight variable varies along a weight design axis. At one end of the axis is the master design of least weight, called "light"; at the other end the design of heaviest weight, called bold. An example using the character "W" is shown in FIG. 1. The user can select a custom weight value virtually anywhere along the weight design axis 13.

More complex matrices are also possible using more than one design axis, for example weight and width. A user can generate an instance of a character on-the-fly by choosing a point anywhere along the two design axes of such a multiple master typeface.

Prior to the development of multiple master fonts, a font family included only several discrete weights, for example, regular, semibold, bold and black. Such font families contained one or two variations in width (e.g., condensed and expanded), and specific character designs were sometimes provided for individual point sizes. Users were limited to the choices available in the font family, or they had to use artificial techniques for bolding, lightening, expanding compressing an existing design. The newer multiple master typefaces enable users to select the value of the weight, width, size and style of the typefaces along a linear scale to suit their needs.

Because multiple master typefaces are generated on-the-fly, substantially less computer storage space is required than was necessary where the entire font was maintained in storage for each weight, width or design required. Moreover, multiple master typefaces made possible the technique of font substitution, as described in U.S. Pat. No. 5,185,818 assigned to the same assignee as the subject invention. These multiple master typefaces also make documents more portable because, when a document is composed in one font and then sent to a display device that does not have that font, a multiple master typeface can be used to automatically emulate a specified font with a high degree of accuracy.

The more widespread use of multiple master typefaces has created certain problems. One of them, solved by this invention, is the unintended creation of character-specific anomalies as the weight, width, style and size are selected along their respective design axes. Whereas many of the individual characters which are selected along the various design axes using linear interpolation may be artistically pleasing, others at certain weights and widths are not so pleasing.

Referring to FIG. 1, the letter "W" is a representative character of a multiple master font of characters. Only a single font property, weight is varied along a single design axis. The "W" gets bolder as the weight increases downwardly in the direction of the arrow 13. Letter 10 at the top of the page is the lightest weight character of the ten characters shown in FIG. 1. Character 11 shown at the bottom of the page is the boldest of the ten characters.

As will be understood by one skilled in the art, this illustration in FIG. 1 represents a selection of ten characters. The font could well include interpolations and extrapolations generating a myriad of additional "W's" that are not shown in FIG. 1 or, for that matter, in FIGS. 2 and 3 which will be explained later.

To the untutored eye, all the characters in FIG. 1 generally look like a letter "W". However to a font designer, at least some of these characters are not artistically pleasing. As the font gets heavier, a font designer might prefer to connect serifs 14 and 16 instead of leaving gap 15 between them. At an even heavier weight, the designer might prefer to connect serifs 17 and 19 and eliminate gap 18 between them. In addition, the slanting line 20 in character 21 overcomplicates the character, and a font designer might prefer to have this line 20 removed. Until the present invention, there was no technique available for inserting these character-specific attributes into a multiple master font design. This invention provides a way of overcoming that deficiency.

BRIEF DESCRIPTION OF THE INVENTION

Briefly, the method of this invention provides a way to display predefined characters contained in a font which maintain their artistically pleasing shapes as font design properties change over a font design axis (which defines a variable font design property). The method includes the steps of:

(1) including within each character definition a character-specific transition point which will be used to select a predefined character attribute of the character when it is displayed, the transition point lying along the font design axis; and (2) selecting a value for the variable font design property of the character along the font design axis, arid then determining a predefined character attribute for the character based upon the location of the selected value in relation to the character-specific transition point along the font design axis. Finally, the character is displayed using the selected value of the variable font design property and the determined, predefined character attribute. Two or more font design axes may be used, as will be explained in more detail later.

BRIEF DESCRIPTION OF THE DRAWINGS

FIG. 4 is a flow chart of the method of this invention.

DETAILED DESCRIPTION OF THE PREFERRED EMBODIMENT

Figure 1:
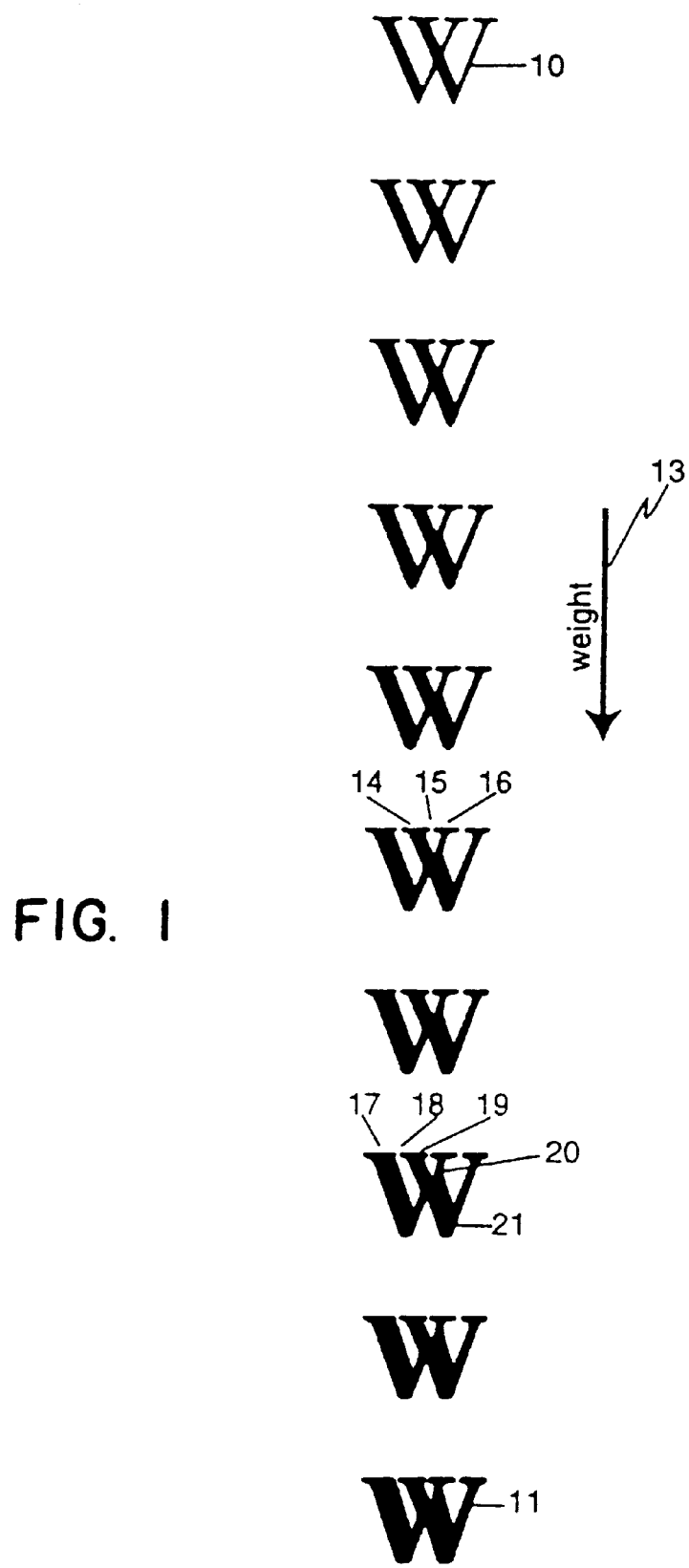
FIG. 1 illustrates a prior art character of a multiple master font as the font weight varies from light to bold.
Figure 2:
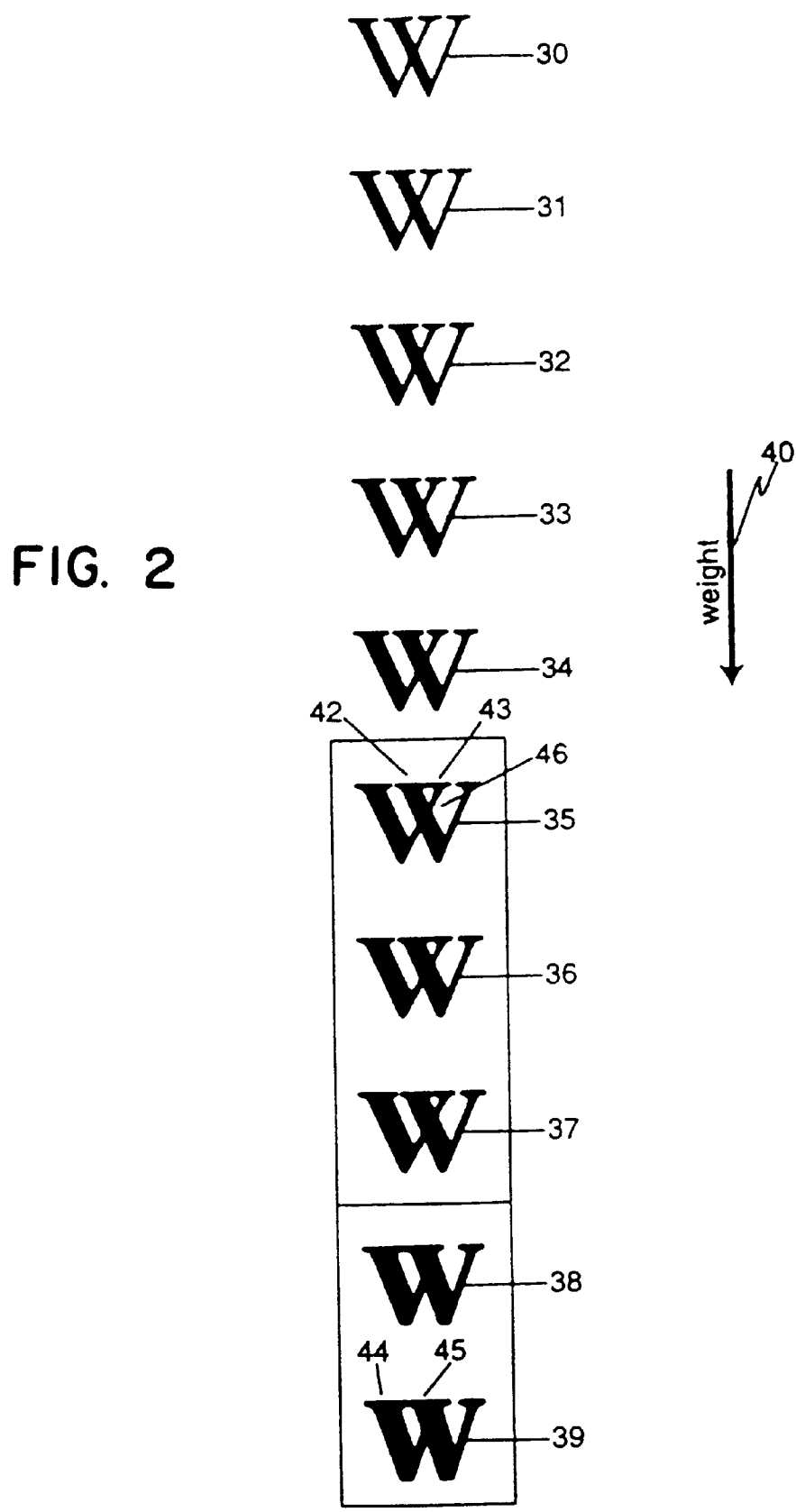
FIG. 2 shows the same character of a multiple master font as FIG. 1, but incorporating the improvement of this invention.

FIG. 2 shows the same letter W shown in FIG. 1, but incorporates the improvement of the invention. As in FIG. 1, the weight of the W in FIG. 2 varies only along a single weight design axis. The weight varies from the lightest character 30 at the top to the boldest character 39 at the bottom along the direction of the arrow 40 along the weight design axis. In this example, assume that the weight goes from a relative weight of 10% (represented by the lightest character 30) to 100% (represented by the boldest character 39). As the character weight gets heavier from character 30 through characters 31, 32, 33 and 34, the font design remains constant, only the weight is linearly interpolated or extrapolated in accordance with prior art multiple master font technology.

It has been determined, according to this invention, that the character becomes more artistically pleasing if the character design changes at or above a weight of 60% transition. Character 35 is the first character which lies at or above that 60% transition point along the weight design axis 40.

Five characters 30–34 are shown in FIG. 2 below the 60% point in weight, and five characters 35–39 are above it. The font designer determined that serifs 42 and 43 should be connected in the range from a 60% weight value and below a 90% weight value. This encompasses characters 35, 36 and 37. The font designer also determined that serifs 44 and 45 should be connected in the range from 90% weight value to a 100% weight value, encompassing characters 38 and 39. Also in the range from 90% weight to 100% weight, the designer determined that stem 46 makes the character appear too visually complicated, so it should be removed. Accordingly, it was removed from characters 38 and 39.

It is apparent from FIG. 2 that the two changes made to character 35 are maintained in the increasingly bold characters 36 and 37 along design axis 40, but additional changes take place in characters 38 and 39. The designer has elected to make different changes within different specified ranges of weight values in accordance with the invention.

Figure 3:
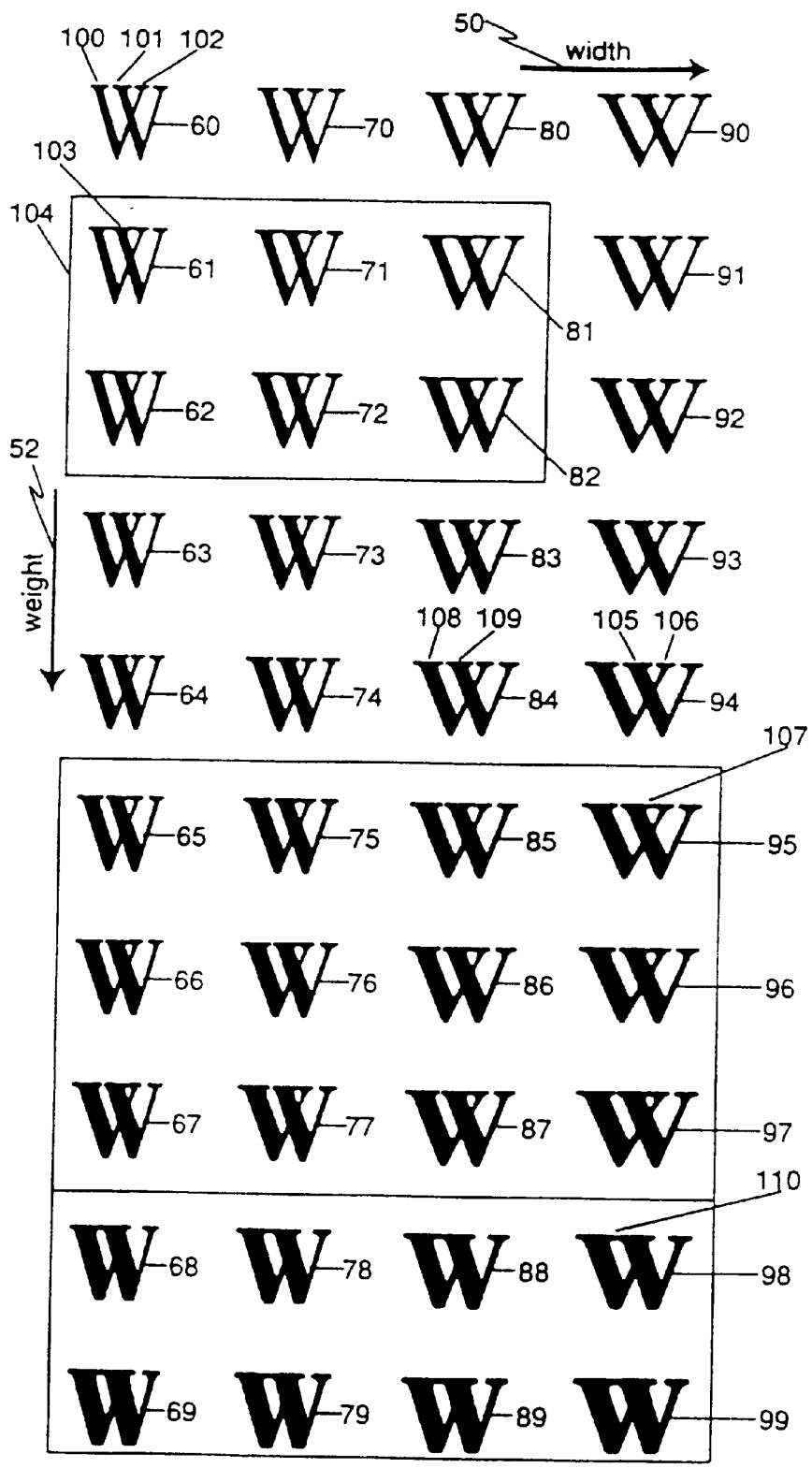
FIG. 3 shows a character of a multiple master font which varies over two design axes and incorporates the improvement of this invention.

Another embodiment of the invention is shown in FIG. 3 which illustrates a matrix of instances of the character W of a multiple master font where the value of the font width characteristic increases from left to right as shown by arrow 50 and the value of the font weight characteristic increases from top to bottom in the direction of arrow 52. As in the previous embodiment shown in FIG. 2, the weight increases so that the lightest instances are in the top row of characters 60–90, and the heaviest instances are in the bottom row of characters 69–99.

The width, on the other hand, only varies from left to right along in each row. The width and weight variables are independent. Character 70 is wider than character 60; character 80 is wider than character 70; and character 90 is wider than character 80. The same increasing width occurs from left to right in each of the ten rows shown in FIG. 3. However, characters lying in any single column, such as characters 90, 91 and 92 in the right column, all were created using the same value of the width property.

Measured in units, the width of the characters shown varies only in four incremental steps, to which values will be assigned in the range 25% to 100%. For example, character 60 represents a 25% width; character 70 represents a 50% width, character 80 a 75% width and character 90 a 100% width.

In the embodiment of FIG. 3, proceeding from the lightest and narrowest character 60, the design of the characters stays constant as the character weights and widths change from character 60 to character 90. As the value of the weight property increases from a weight of 10% for character 60 to 20% for character 61, it was artistically determined that a change in the character design occur at that transition point in the weight axis.

Accordingly, the three serifs 100, 101 and 102, which were separated from each other in character 60, become joined into a single serif 103 in bolder character 61. This attribute change is effected in the region bounded by values of the weight property between 20% and 30%, and by values of the width property between 25% and 75%. In FIG. 3, the W's in box 104 are affected by this change.

In addition, the changes in character shape artistically determined in the example of FIG. 2 have also been applied to this example. Characters of weight value from 60% to 80%, encompassing instances 65–67, 75–77, 85–87 and 95–97, have their two center serifs, 105 and 106, joined into one serif 107. Characters of weight value 90% to 100% encompassing instances 68, 69, 78, 79, 88, 89, 98 and 99, have their two left serifs, 108 and 109, joined into one serif 110, as desired by the designer, and serif 106 is omitted.

FIG. 4 is a flow chart illustrating an example of the method of an embodiment of this invention, as applied to the character set shown in FIG. 2. In step 80, a determination is made whether the character weight is 60% or above. In FIG. 2, that transition point is along the weight design axis 40 at character 35.

If the answer in Step 80 is yes, then another test is made in Step 81. That test determines whether the character weight is 90% or above. If so, then Step 82 instructs the character to be drawn with serifs 44 and 45 joined, as shown on character 39, and with feature 46 removed. On the other hand, if, in Step 81, it is determined that the character weight is not above the 90% transition point, in Step 83 the character is drawn with serifs, 42 and 43 connected and with feature 46 included, as shown in character 35.

If the character weight is determined in step 80 to be below the 60% point, in Step 84 the character is drawn with all serifs separated and with feature 46 present, as shown in characters 30–34.

The above example, shows how the same technique of changing character-specific attributes can be employed using two design axes, width and weight. As will be apparent to one of ordinary skill in the art, more than axes could be used in the determination of character-specific changes in accordance with the teachings of this invention. In addition, the same feature maybe be sequentially added and removed more than once at different transition points. Moreover, many other changes in the method described above maybe be made by the skilled practitioner without departing from the spirit and scope of the invention, which should be limited only as set forth in the claims which follow.

We claim:

1. A method of displaying a character, comprising:

obtaining a digital character definition for the character from a font;

determining an optional character design feature in the font, the presence or absence of said optional design feature which changes the design of the character but not a specific character that is represented;

determining a transition point for a specified variable characteristic of the font as a point where the font has an unpleasing look in one relation with the specified variable characteristic when the optional design feature is included and has an acceptable look in the other relation with the specified variable characteristic when the optional design feature is included;

selecting a value for said specified variable characteristic of the font design property;

comparing the value of the specified design characteristic to the transition point; and displaying a character with the optional character design feature only if said specified variable characteristic is within the other relation that produces an acceptable look, so that character includes said specified design characteristic if it is within the acceptable characteristic, and the same character does not include the specified design characteristic if it is within said one relation that produces an unpleasing look.

2. The method of claim 1 wherein the font design property is selected from the group consisting of character weight, character width and character size.

3. The method of claim 1 wherein the optional character design feature comprises an opening between serifs.

4. The method of claim 1 wherein the optional character design feature comprises a stem.

5. The method of claim 1 wherein the optional character design feature is displayed when the user-selected value of the font design property is below the transition point and is not displayed when the user-selected value is above the transition point.

6. The method of claim 1 wherein the character definition includes a second transition point that determines whether a second optional character design feature is to be displayed.

7. The method of claim 6 wherein the first and second optional character design features each comprise an opening between serifs.

8. A method of displaying a character, comprising:

obtaining a digital character definition for a specific character from a multimaster font, the definition including, being a value of a first font design property lying on a first font design axis, a second transition point, being a value of a second font design property lying on a second font design axis, and an optional character design feature which is a feature that is can be present in said specific character, or not present in said specific character, and a transition point for a specified variable characteristic of the character as a point where the character has an unpleasing look in one relation with the specified variable characteristic when the optional design feature is included and has an acceptable look in the other relation with the specified variable characteristic when the optional design feature is included;

acquiring user-selected values of the first and second font design properties;

comparing the user-selected value of the first font design property to the first transition point in the character definition;

comparing the user-selected value of the second font design property to the second transition point in the character definition; and displaying the character with the optional character design feature only if the user selected value has a specified relation with said transition point, and otherwise displaying the character without the optional design feature, according to the result of the comparisons between the user-selected values and the transition points, whereby a change in the design of the character occurs at the transition points.

9. The method of claim 8 wherein the first and second font design properties comprise character width and character weight, respectively.

10. The method of claim 8 wherein the optional character design feature comprises an opening between serifs or a stem.

11. The method of claim 1 wherein the transition point is character specific.

12. A method as in claim 1 wherein said optional character design feature is a stem on the character, and said character definition is a character boldness.

\* \* \* \* \*